3,141,775
EMULSIFIABLE CONCENTRATE

John M. Surgant, Richmond Heights, Mo., assignor to Monsanto Company, a corporation of Delaware
No Drawing. Filed May 23, 1961, Ser. No. 111,918
4 Claims. (Cl. 99—9)

This invention relates to new and useful emulsifiable concentrate for agricultural purposes.

From a practical standpoint the manufacturer of a water-insoluble agronomical agent must supply the agriculturist with a low-cost concentrate thereof in such form that by merely mixing with water at the point of use he will have an easily prepared agronomical spray. It has been customary in the preparation of concentrates that such water-insoluble agronomical agents be dissolved in an organic solvent therefor and to admix with the organic solution a water-soluble surface-active agent. As those skilled in the art are well aware the specifications for an emulsifying and/or wetting agent in packaged goods which must withstand the effects of storage are exacting. The passage of time and changes of temperature encountered in normal storage often materially affect the emulsifying and/or wetting properties of the surface-active agent. Additionally the surface-active agent may react with the agronomical agent or be otherwise affected by it over a period of time and thus cause the active ingredient to lose or materially lessen its agronomical properties. Also in many instances while a particular water-insoluble agronomical agent may be highly useful its usage, e.g., application to the surface of edible consumer goods and forage plants, has been limited or negatived by virtue of the particular organic solvent employed to solubilize it by reason of objectionable odors and for other reasons of which those skilled in the art are thoroughly familiar.

2,2,4-trimethyl - 1,2 - dihydroquinolines, particularly 6-ethoxy - 2,2,4 - trimethyl - 1,2 - dihydroquinoline which is a water-insoluble yellow oily liquid, have been found to be useful for preserving the nutritive value of feeds and forage plants, particularly alfalfa. However, their usage has been curtailed by virtue of the organic solvents (usually high molecular weight alcohols such as decyl alcohol and dodecyl alcohol) employed to make concentrated solutions thereof because of injury to the treated surface as well as objectionable odors characterizing the residues after application in the field.

In accordance with this invention there is provided emulsifiable concentrates of 2,2,4 - trimethyl - 1,2 - dihydroquinolines which are self-emulsifiable in water and which are capable of withstanding the effects of storage. The emulsifiable concentrates of this invention comprise a 2,2,4 - trimethyl - 1,2 - dihydroquinoline and water in a weight ratio of approximately 1 to 4:1 and for each 10 parts by weight of water, approximately 0.5 to 5 parts by weight of a water-soluble non-ionic surfactant which is the condensation product of one mol of a mono-higher fatty acid ester of hexitol anhydride with approximately 10 to 30 mols of alkylene oxide and approximately 0.5 to 5 parts by weight of mono-higher fatty acid ester of glycerol. In general the weight of the non-ionic surfactant in the emulsifiable concentrate will not be less than the weight of the mono-higher fatty acid ester of glycerol.

By "2,2,4 - trimethyl - 1,2 - dihydroquinolines" is meant compounds of the structure

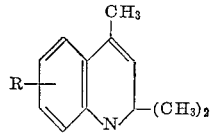

wherein R is hydrogen, a hydrocarbon or a hydrocarbonoxy radical (e.g., methyl, ethyl, propyl, butyl, amyl, hexyl, heptyl, phenyl, tolyl, benzyl, cyclohexyl, cyclopentyl, methoxy, ethoxy, propoxy, butoxy, heptoxy, phenoxy, tolyloxy, benzyloxy, cyclohexyloxy, methylcyclohexyloxy, etc., and the various isomeric forms thereof) containing 1 to 7 carbon atoms. It is preferred that R be in the 6-position and preferably be a lower alkoxy group (e.g., methoxy, ethoxy, propoxy, butoxy, and the various isomeric forms thereof).

By "mono-higher fatty acid ester of glycerol" is meant mono-esters of glycerol and a higher fatty acid such as lauric acid, myristic acid, palmitic acid, ricinoleic acid, stearic acid, and the like fatty acids containing 12 to 20 carbon atoms as well as mixtures thereof. As exemplary of such mono-esters are glycerol monolaurate, glycerol monomyristate, glycerol mono-palmitate, glycerol mono-oleate, glycerol mono-stearate, and mixtures thereof.

By "mono-higher fatty acid ester of hexitol anhydrides" as employed herein and in the appended claims is meant mono-esters of hexitol anhydrides and a higher fatty acid such as lauric acid, myristic acid, palmitic acid, oleic acid, ricinoleic acid, stearic acid and the like fatty acids containing from 12 to 20 carbon atoms as well as mixtures thereof. As exemplary of such esters are sorbitan mono-laurate, mannitan mono-laurate, sorbitan mono-palmitate, sorbitan mono-oleate, mannitan mono-oleate, sorbitan mono-stearate, etc., and various mixtures thereof.

By "alkylene oxide" as employed herein and in the appended claims is meant ethylene oxide, propylene oxide and mixtures thereof. These materials can be represented by the empirical formula $C_nH_{2n}O$ wherein $n$ is a whole number from 2 to 3. Ethylene oxide is the preferred alkylene oxide.

Typical emulsifiable concentrates of this invention comprise (in parts by weight)

*Components/Composition*

| | A | B | C | D | E | F |
|---|---|---|---|---|---|---|
| Water | 22 | 23 | 22 | 23 | 43 | 43 |
| 6-ethoxy-2,2,4-trimethyl-1,2-dihydroquinoline | 71 | 70 | 71 | 70 | 47 | 47 |
| Glycerol mono-ester [1] | 2 | 2 | 2 | 2 | 5 | 5 |
| 1 mol of sorbitan mono-oleate condensed with 20 mols of ethylene oxide | 5 | 5 | | | | 5 |
| 1 mol of sorbitan mono-laurate condensed with 20 mols of ethylene oxide | | | 5 | 5 | 5 | |

[1] Mono-ester of glycerol and higher fatty acid wherein the higher fatty acid is a mixture in weight percent of 21% palmitic, 2% stearic, 33% oleic and 44% linoleic acid.

The emulsifiable concentrates of this invention are characterized by excellent wetting characteristics with respect to waxy surfaces of forage crops, as for example the surface of alfalfa. To demonstrate the wetting characteristics the following compositions (in parts by weight)

| | W | X | Y | Z |
|---|---|---|---|---|
| 6-ethoxy-2,2,4-trimethyl-1, 2-dihydroquinoline | 70 | 70 | 70 | 70 |
| Water | 25 | 20 | 25 | 28 |
| Glycerol mono-ester [1] | | 5 | 5 | 1 |
| 1 mol of sorbitan mono-oleate condensed with 20 mols of ethylene oxide | 5 | 5 | | 1 |

[1] Mono-ester of glycerol and higher fatty acid wherein the higher fatty acid is a mixture in weight percent of 21% palmitic, 2% stearic, 33% oleic and 44% linoleic acid.

respectively, upon mixing with water to provide sprayable compositions containing 500 p.p.m. of 6-ethoxy-2,2,4-trimethyl - 1,2 - dihydroquinoline showed that Composition X wetted 90 to 100% of the surface of alfalfa sprayed while Compositions W, Y and Z, respectively, wetted 50% or less of the surface of the alfalfa sprayed.

To further illustrate this invention Composition C aforedescribed on standing 12 months under normal storage conditions exhibited no signs of oiling out of 6-ethoxy - 2,2,4 - trimethyl - 1,2 - dihydroquinoline, was self-emulsifiable with water, and exhibited excellent wetting characteristics with respect to waxy surfaces, for example, the surface of alfalfa. In contrast to such a concentrate containing in parts by weight 70 parts of 6-ethoxy - 2,2,4 - trimethyl - 1,2 - dihydroquinoline, 10 parts by weight of condensation product of 1 mol of sorbitan mono-oleate with 20 mols of ethylene oxide and 20 parts by weight of water exhibited oiling out of 6-ethoxy-2,2,4-trimethyl-1,2-dihydroquinoline after 2 days under normal storage conditions, required mechanical effort to emulsify in water, and exhibited poor wetting characteristics with respect to waxy surfaces, for example the surface of alfalfa.

What is claimed is:

1. An emulsifiable concentrate comprising a 2,2,4-trimethyl-1,2-dihydroquinoline and water in a weight ratio of approximately 1 to 4:1 and for each 10 parts by weight of water 0.5 to 5 parts by weight of water-soluble non-ionic surfactant which is the condensation of one mol of a mono-higher fatty acid ester of hexitol anhydride with 10 to 30 mols of alkylene oxide and approximately 0.5 to 5 parts by weight of mono-higher fatty acid ester of glycerol.

2. An emulsifiable concentrate of claim 1 wherein the 1,2-dihydroquinoline is 6-lower alkoxy - 2,2,4 - trimethyl-1,2-dihydroquinoline.

3. An emulsifiable concentrate of claim 1 wherein the 1,2-dihydroquinoline is 6-ethoxy-2,2,4-trimethyl-1,2-dihydroquinoline.

4. An emulsifiable concentrate comprising about 71 parts by weight of 6-ethoxy-2,2,4-trimethyl-1,2-dihydroquinoline, about 22 parts by weight of water, about 5 parts by weight of water-soluble non-ionic surfactant which is the condensation product of one mol of sorbitan mono-oleate and 10 to 30 mols of ethylene oxide, and about 2 parts by weight of glycerol mono-ester of higher fatty acids and mixtures thereof.

References Cited in the file of this patent

UNITED STATES PATENTS

| | | |
|---|---|---|
| 2,661,277 | Mowry et al. | Dec. 1, 1953 |
| 2,692,822 | Denny | Oct. 26, 1954 |

FOREIGN PATENTS

| | | |
|---|---|---|
| 815,510 | Great Britain | June 24, 1959 |